United States Patent [19]

Muhammad

[11] 4,252,377
[45] Feb. 24, 1981

[54] BLOWOUT PROTECTOR
[75] Inventor: Clifton C. Muhammad, Chicago, Ill.
[73] Assignee: Carter Bros. Iron Works, Inc., Chicago, Ill.
[21] Appl. No.: 893,760
[22] Filed: Apr. 5, 1978
[51] Int. Cl.³ .................................................. B60B 15/00
[52] U.S. Cl. ................................. 301/44 T; 301/47; 301/6 D
[58] Field of Search ............... 152/213 R, 213 A, 216; 301/6 R, 6 D, 6 V, 38 R, 38 S, 39 R, 39 T, 40 R, 40 S, 41 R, 44 R, 44 T, 44 B, 47–49, 52, 53, 45, 46, 50

[56] References Cited

U.S. PATENT DOCUMENTS

| 1,908,692 | 5/1933 | Connell | 301/44 T |
|---|---|---|---|
| 2,170,647 | 8/1939 | Ash | 301/39 T |
| 2,209,967 | 8/1940 | Golod | 301/39 T |
| 2,228,423 | 1/1941 | Ticktin et al. | 301/39 T |
| 2,553,891 | 5/1951 | Brosick | 301/39 T |
| 2,594,060 | 4/1952 | Nemeth | 301/6 D |

FOREIGN PATENT DOCUMENTS

| 143821 | 12/1935 | Austria | 301/39 T |
|---|---|---|---|
| 620046 | 1/1927 | France | 301/39 T |

*Primary Examiner*—H. Grant Skaggs
*Attorney, Agent, or Firm*—Hume, Clement, Brinks, Willian & Olds, Ltd.

[57] ABSTRACT

A vehicle tire blowout protector is disclosed which comprises a first sidewall member with a peripheral shoulder having sufficient strength to support the vehicle. The sidewall member is mounted to the vehicle wheel so that it is adjacent to one side of the vehicle tire, and the peripheral shoulder is concentric to, and of a somewhat smaller outer diameter than, the vehicle tire.

1 Claim, 9 Drawing Figures

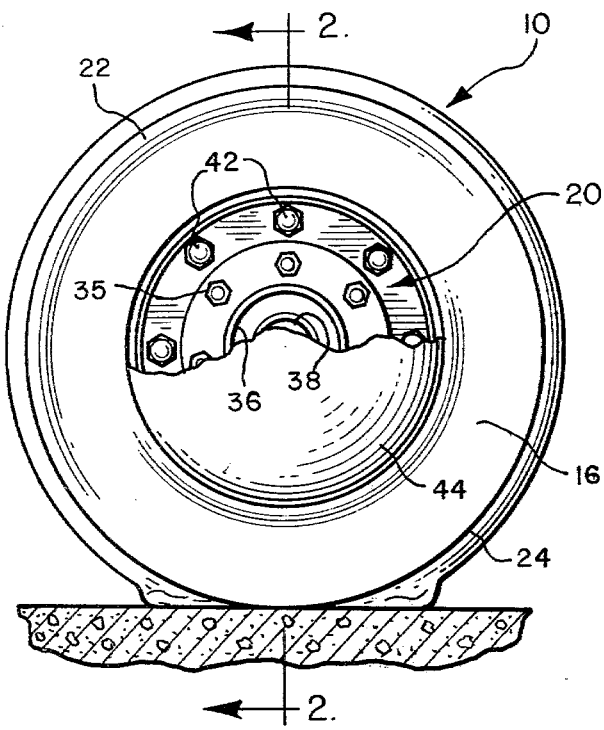
FIG. 1
FIG. 3
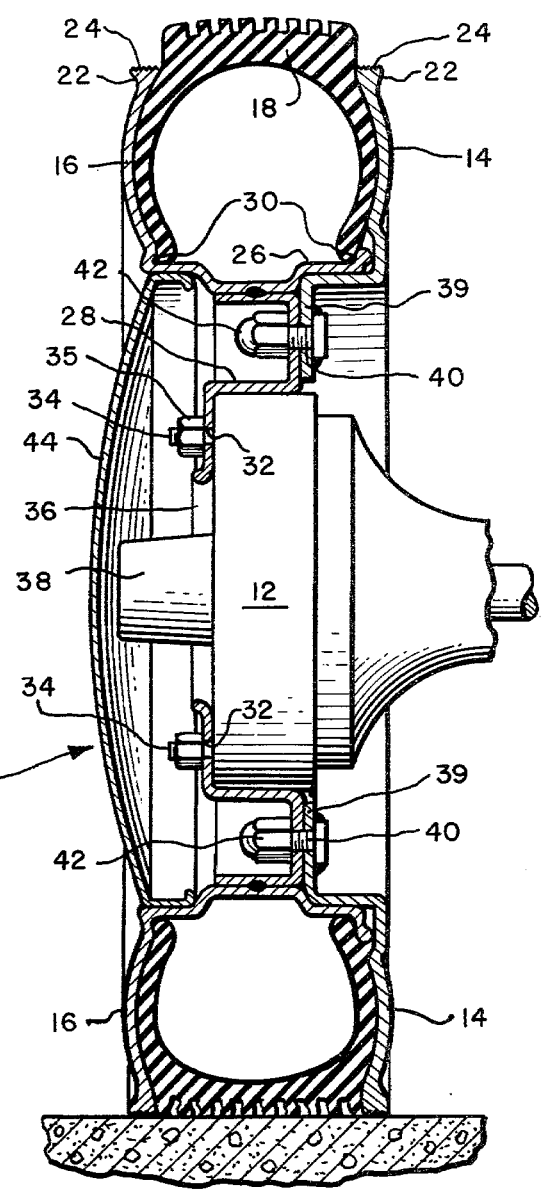
FIG. 2
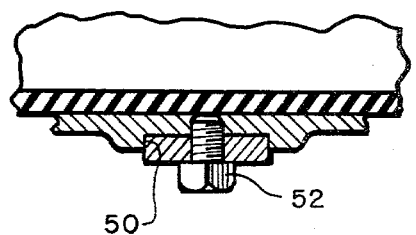
FIG. 4

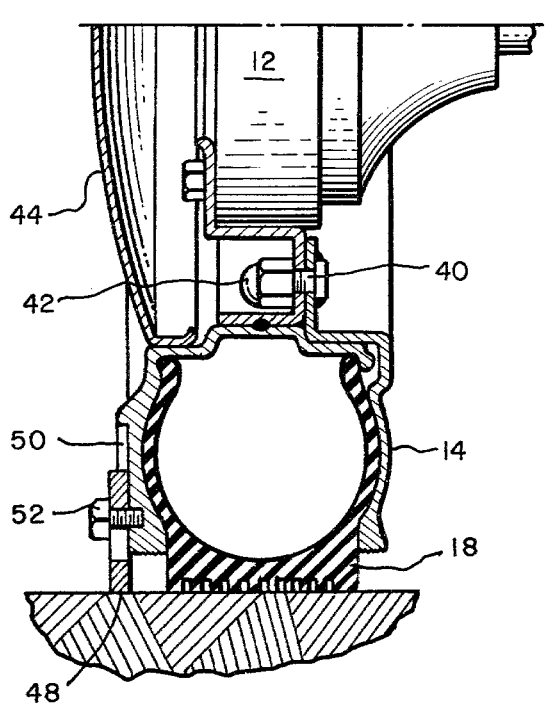
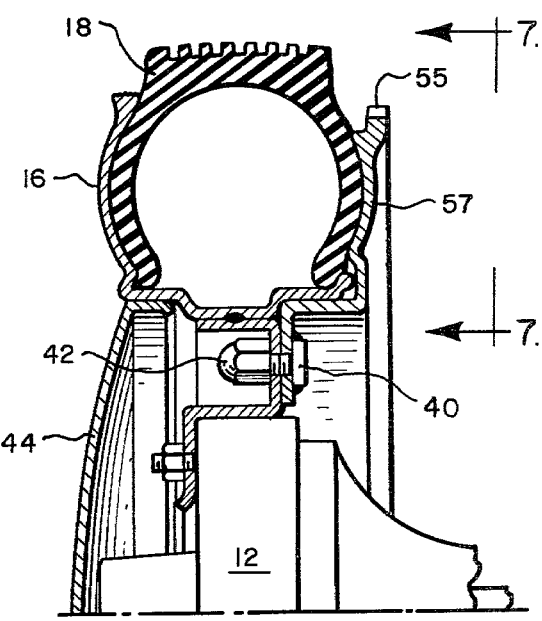
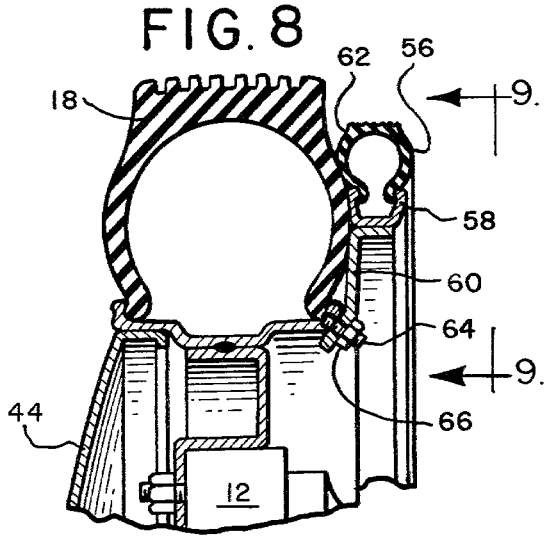
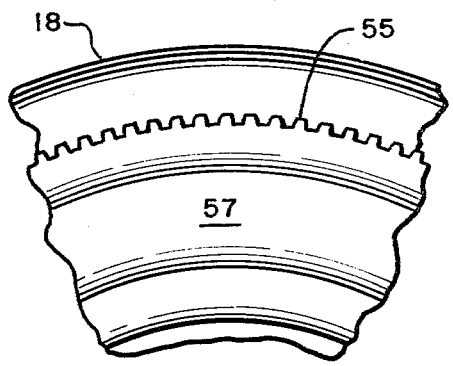
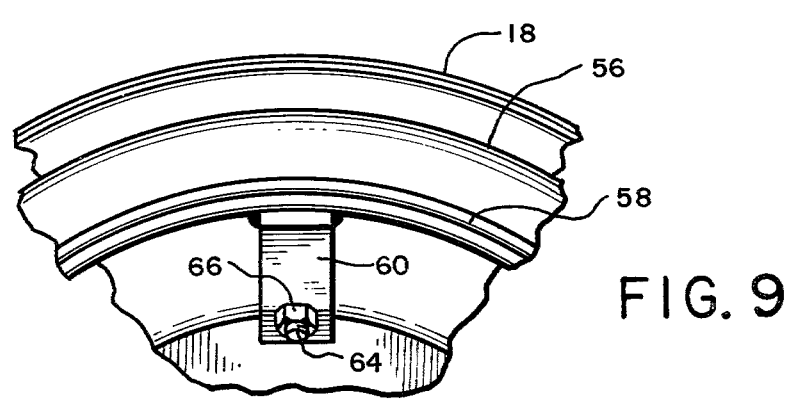

BLOWOUT PROTECTOR

BACKGROUND OF THE INVENTION

This invention relates generally to motor vehicle wheels and tires, and more particularly to blowout protection devices.

Land vehicles such as automobiles and trucks are almost uniformly equipped with air-inflated tires. These tires combine the advantages of a relatively soft ride with great maneuverability. One disadvantage of such tires is the susceptibility to punctures. If a puncture is major and is accompanied by a rapid loss of tire pressure, commonly known as a blowout, it is very easy for the driver to lose control of the vehicle. In fact, blowouts are a major cause of serious automobile accidents.

A great deal of work has been done to increase the puncture resistance of conventional tires. Most of this work has centered around the search for materials which will add to the strength of the tire. While stronger tires have evolved from this research, such tires are often typically far heavier than conventional tires, often adversely affecting the performance and gasoline consumption of the vehicle. Another disadvantage is that heavier tires are often characterized by greater heat build-up during operation, thereby decreasing the life of the tire. Excessive heat build-up has also been shown to increase fuel consumption.

At least one tire manufacture has apparently developed a heavier tire which resists punctures but which avoids the excessive heat build-up found in some such tires. This tire also allegedly has sufficient strength to support the weight of a car for a short time even after loss of air pressure. This feature enables the driver to drive to a service station in the event of a puncture, thereby doing away with the conventionally required spare tire. While this appears to have the capability of solving some of the problems discussed above, the tire undoubtedly would be quite expensive and therefore is unlikely to achieve widespread public acceptance.

Efforts by others to hasten the demise of the spare tire have centered around the use of puncture sealant stored in a pressurized can. When a tire is flattened due to a puncture, sealant is injected under pressure into the tire, thereby inflating it with pressurized air. The sealant flows into the puncture and is intended to seal same. However, unless the puncture is quite small, the sealant will merely blow through the puncture along with the pressurized air. Needless to say, the use of pressurized sealant is also limited in that it cannot be used to protect against blowouts.

SUMMARY OF THE INVENTION

The present invention responds to the problems presented in the prior art by providing a blowout protector which minimizes the possibility of a blowout yet allows the driver to continue driving on even a badly blown out tire, thereby disposing of the requirement of a spare tire.

This invention includes a first sidewall member with a peripheral shoulder having sufficient strength to support the vehicle, and means for mounting said member to a vehicle wheel so that said member is adjacent to one side of the vehicle tire, and said peripheral shoulder is concentric to, and of a somewhat smaller outer diameter than, the vehicle tire. The device may also include a plurality of cleats mounted to said member, said cleats extending radially beyond the periphery of said member to improve traction.

The novel features which are believed to be characteristic of the invention are set forth in the appended claims. It is believed the invention will be best understood by reference to the following description taken in connection with the accompanying drawings in which:

FIG. 1 is a side elevation view of one embodiment of the invention showing the vehicle tire deflated, with the wheel cover partially broken away;

FIG. 2 is a sectional view taken along line 2—2 of FIG. 1;

FIG. 3 is a side elevation view of a second embodiment of the invention;

FIG. 4 is a sectional view taken along line 4—4 of FIG. 3;

FIG. 5 is a sectional view taken along line 5—5 of FIG. 3;

FIG. 6 is a side elevation view of another embodiment of the invention;

FIG. 7 is a sectional view taken along line 7—7 of FIG. 6;

FIG. 8 is a side elevation view of yet another embodiment of the invention; and

FIG. 9 is a sectional view taken along line 9—9 of FIG. 8.

DETAILED DESCRIPTION OF THE PREFERRED EMBODIMENTS

Referring now to the figures, there is shown a blowout protector, indicated generally by the numeral 10. The invention is shown as being mounted to a conventional automobile brake drum 12. In the embodiments depicted in FIGS. 1-5, inner and outer sidewalls 14 and 16 substantially cover and generally coincide with the sides of the vehicle tire 18, thereby providing lateral puncture protection. The outer member of the depicted embodiment is actually a coextensive part of the vehicle wheel 20. Each sidewall member 14 and 16 includes a shoulder 22 along its outer periphery. These shoulders 22 are preferably flanged and must, along with the remainder portions of the sidewall members, be sufficiently strong to support the weight of the vehicle for at least a limited period of time. This ordinarily requires the use of steel although lighter materials such as aluminum may be used for some applications.

As shown perhaps best in FIG. 3, the sidewall peripheral shoulders 22 are concentric to, and have a somewhat smaller outer diameter than, the vehicle tire 18. The phrase "somewhat smaller" as used herein is intended to define a size which is sufficiently small so that the shoulder does not contact the road during normal operation but, in the event of a puncture or blowout, allows the vehicle to be driven on the sidewall shoulder without serious balance or maneuverability problems. The sidewall peripheral shoulders 22 desirably include a tread design 24 to maximize traction and maneuverability.

As mentioned above, the outer sidewall in the depicted embodiment is coextensive with the vehicle wheel 20 although, alternatively, both the inner and outer sidewalls may be removably mounted to the wheel assembly. In some applications it may be desirable to construct the inner, rather than the outer, sidewall coextensive with the vehicle wheel. The phrase "vehicle wheel" as used herein is intended to include the wheel rim 26 and the wheel hub 28. With the exception of the wheel rim extension forming one sidewall, the rim 26 is of conventional design, and includes a lip 30 adapted to maintain the inner periphery of the tire in position. The wheel rim 26 is rigidly secured to the wheel hub 28, which includes spaced apertures 32. These apertures 32, shown best in FIG. 1, are adapted to receive the wheel mounting studs 34, which extend from the brake drum 12. Mounting nuts 35 are adapted to securely fasten the wheel to the brake drum. As shown in FIG. 2, the wheel hub 28 is of a concave shape to complement and receive the brake drum 12. The wheel hub also includes a center aperture 36 adapted to receive the axle hub 38.

The inner sidewall 14 is removable from the wheel 20 to facilitate the mounting and removal of the tire 18. If the inner sidewall is coextensive with the wheel, then the outer sidewall should be removable. The depicted removable inner sidewall 14 includes an annular flange 39 which is mounted to the wheel hub 28 by bolts 40 which, with nuts 42 tightly threaded thereto, rigidly maintain this sidewall in position with respect to the wheel 20 and the tire 18.

Thus, to assemble the wheel, tire and sidewall assembly, the tire 18 is first mounted to the wheel rim 26. This can be done with a conventional mounting machine. With the tire in place, the removable sidewall 14 is mounted to the wheel/tire assembly by bolts 40 and their nuts 42. Once the sidewalls are fixed to the wheel, the entire assembly can be mounted to the brake drum 12 via studs 34 and their nuts 35. The wheel cover 44 can then be put in place and assembly is complete.

During normal operating conditions, the sidewall peripheral shoulders 22 have a somewhat smaller outer diameter than the fully inflated vehicle tire 18. Thus, the shoulders will not contact the driving surface. However, if a blowout occurs, or if the tire becomes deflated for any other reason, the tire will compress and the sidewalls 14 and 16 will support the vehicle as shown in FIGS. 1 and 2. Even in the event of a major blowout, the driver can continue to operate the vehicle until a service station is encountered. The tread design in the sidewall shoulders minimizes slippage if a change of speed is necessary or slippery surface conditions are encountered. The fact that the sidewalls are rigidly mounted to the wheel prevents rotation of the sidewalls with respect to the wheel upon acceleration or deceleration.

FIGS. 3–5 depict the use of traction cleats 46 adapted for use in slippery, particularly snowy, driving conditions. Each cleat 46 desirably is treaded or grooved at its operative end 48 to maximize traction. The illustrated embodiment includes three such cleats 46, but any number can actually be used. The cleats 46 are shown in FIG. 5 as being mounted to only one of the sidewalls although use on both sides may be desirable in some circumstances.

The cleats 46 are mounted in radially extending grooves 50 in the sidewall 14 or 16 to prevent rotation upon contact with the driving surface. A bolt 52 is utilized to secure each cleat 46 in place. During the summer months, or at other times when the cleats are not needed, they may simply be removed. However, it is also desirable that the cleats be radially adjustable as shown, so that they can be shifted between operative and inoperative positions without actually removing them from the sidewall. This also allows the positioning of the cleats at various operative traction settings, thus providing a degree of versatility unparalleled in the prior art. This radial adjustability feature is provided by use of a longitudinal slot 54 in each cleat 46, through which the cleat bolt 52 is inserted.

The cleats 46 are constructed of a relatively rigid material. Due to the legal requirements of some states, this material may have to be hard rubber. Alternatively, where permissible, various metallic substances may be used.

The embodiment shown in FIGS. 6 and 7 is substantially the same as that of FIGS. 1–5 except that one of the sidewalls, preferably the removable inner one, includes means for mechanically transmitting power to an external load. This means may comprise a belt wheel or chain sprocket or, as in the depicted embodiment, gear teeth 55 cut in the outer periphery of the sidewall. The geared sidewall 57 should always be used with a second sidewall for supporting the vehicle in the event of tire failure. For this reason, the outer diameter of the geared sidewall is preferably slightly less than that of the sidewall mounted to the other side of the vehicle tire.

This embodiment provides the lateral blowout protection of the above embodiments, yet provides an energy transmission capability not previously realized. The vehicle can be jacked up to free the drive wheels and, with the use of suitable mechanical power transmission elements such as gears, belts and/or chains, can be used to supply power to any number of imaginable external loads. It is particularly suitable for use in an emergency, such as where power is needed to drive medical care equipment. Alternatively, this drive may be used to power the vehicle by auxiliary means such as a propeller to elevate the vehicle or propel it through water.

The phrase "sidewall member" as used herein is not intended to be limited to the type of blowout protectors depicted in FIGS. 1–7, which substantially cover the sides of the tire. It is intended to include the type of protector shown at 56 in FIGS. 8 and 9. This provides sufficient support through the use of a rim 58 and mounting brackets 60, but it also includes a resilient tire 62 to enhance the riding characteristics when the main vehicle tire 18 is deflated.

Three mounting brackets 60 are normally used to support the blowout protector of FIGS. 8 and 9. The brackets 60 are ordinarily welded to the protector tire rim 58 and are mounted to the vehicle wheel rim 26 by means such as the stud and nut design depicted. In this design, studs 64 are welded to the wheel rim 26. After the protector is put in position, nuts 66 are threaded into place on the studs 64. It should be noted that such mounting means can also be used for the embodiment of FIGS. 1–7, rather than the annular flange and bolt design depicted and described in detail hereinabove. That is, brackets (not shown) could extend from inner periphery of the sidewall to the mounting bolts 40, in place of the annular flange 39.

FIG. 8 depicts the protector 56 as being mounted to the inside of the vehicle tire 18. This is desirable since it can thus be utilized without being visible from the exterior of the vehicle. In the event of a blowout the vehicle tire 18 collapses (not shown), thereby allowing the protector tire 62 to contact the driving surface. The protector 56 may be mounted to the outside of the vehicle tire 18, in which case it will probably be somewhat easier to install, but not as cosmetically attraction. This protector may also be mounted to both sides of the vehicle tire, as in the embodiments discussed above.

Of course, it should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the following claims.

I claim:

1. A vehicle tire blowout protector comprising:
   a wheel rim adapted to receive a vehicle tire, said wheel rim including first and second axially-spaced rim lips, one of each of said rim lips being adapted to fit on each side of the inner periphery of the vehicle tire;
   a wheel hub to which said rim lips are permanently affixed, said wheel hub including means for mounting said blowout protector to a vehicle axle;
   a sidewall member extending from said first rim lip, said sidewall member including a shoulder at its periphery which is concentric to said rim lips, and is of sufficient strength to support the vehicle;
   said sidewall member further including a plurality of radial grooves; and
   a plurality of cleats slidably mounted within said radial grooves, each of said cleats being mounted to said member by a pin, and each of said cleats including a longitudinal slot adapted to receive said pin, thus adapting said cleats for radial adjustment between operative and inoperative positions.

* * * * *